Aug. 7, 1934.  F. SLUSHER  1,969,160
BANDING MACHINE
Filed March 6, 1933  7 Sheets-Sheet 2

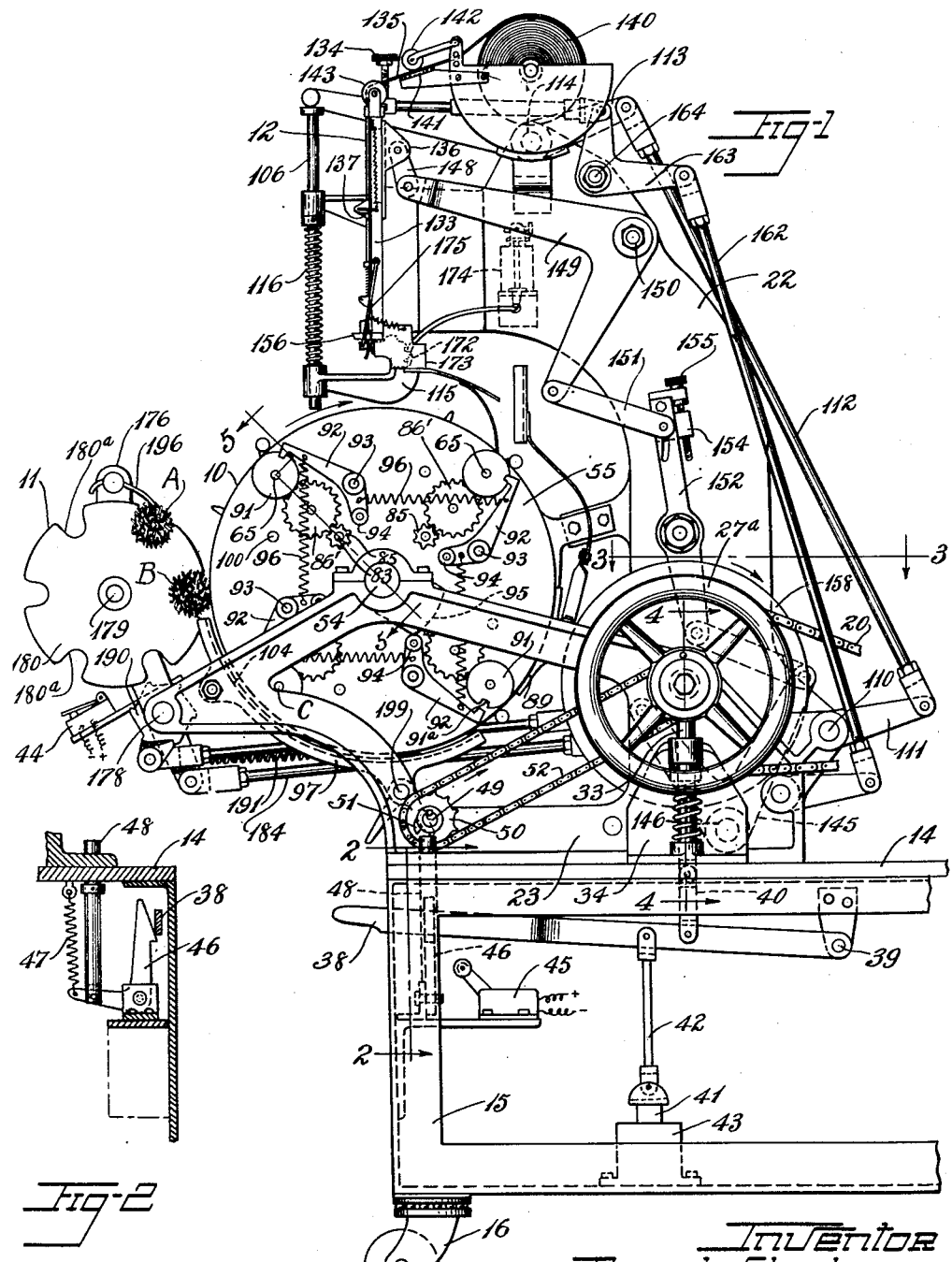

Inventor
Frank Slusher
By Eakin & Avery
Attys.

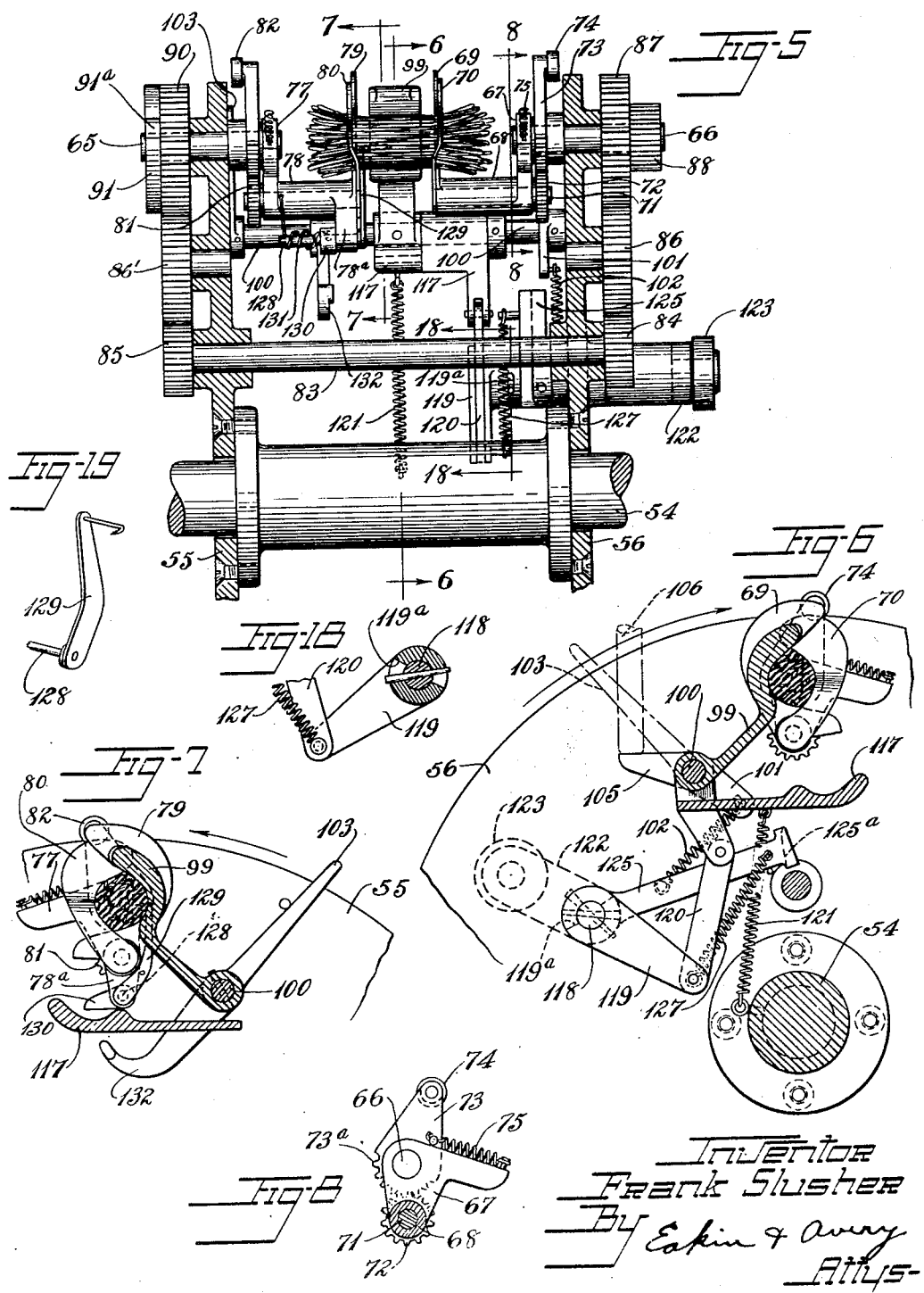

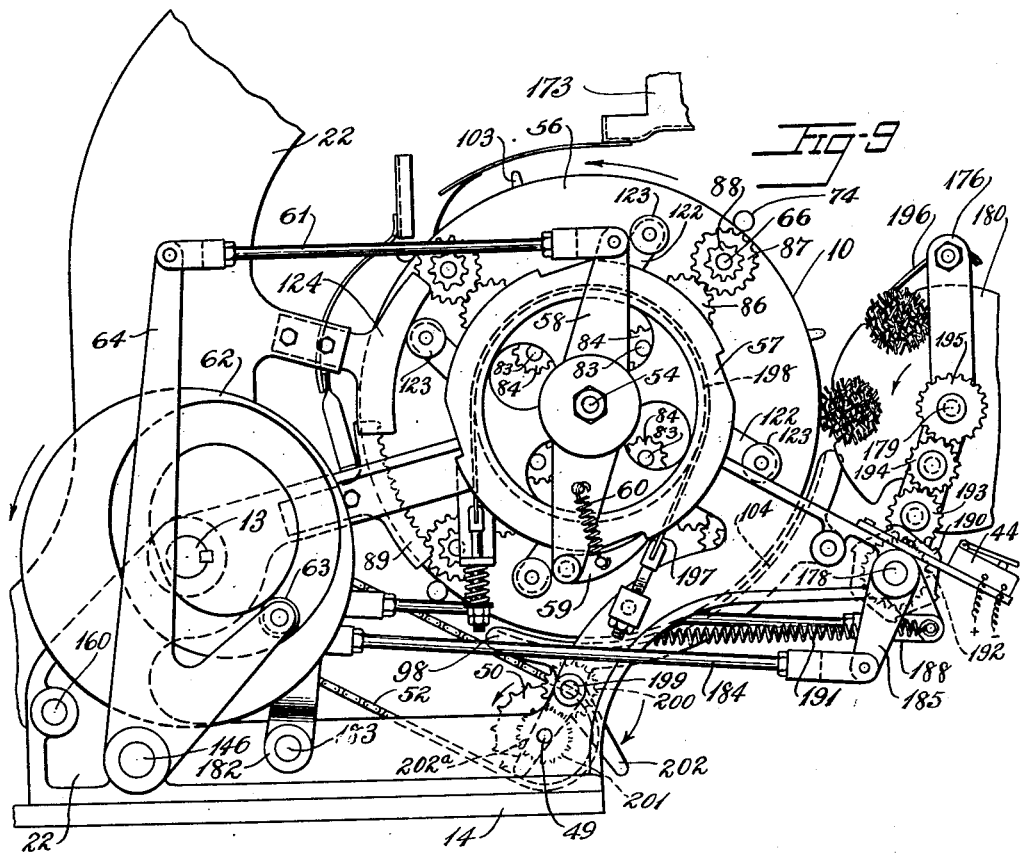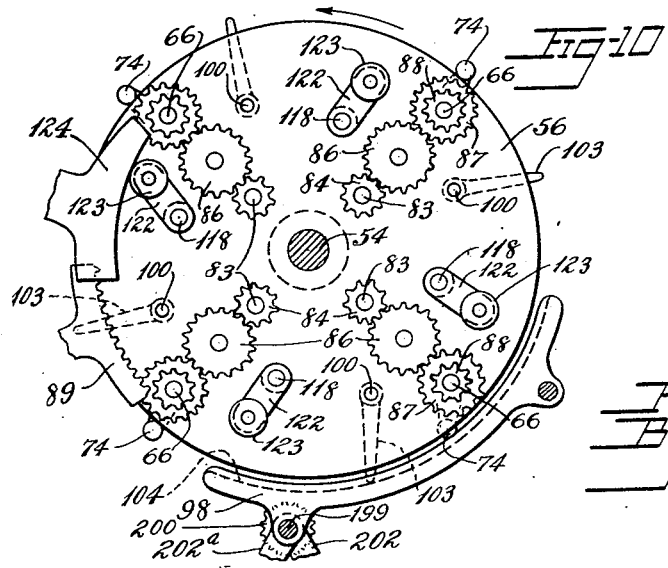

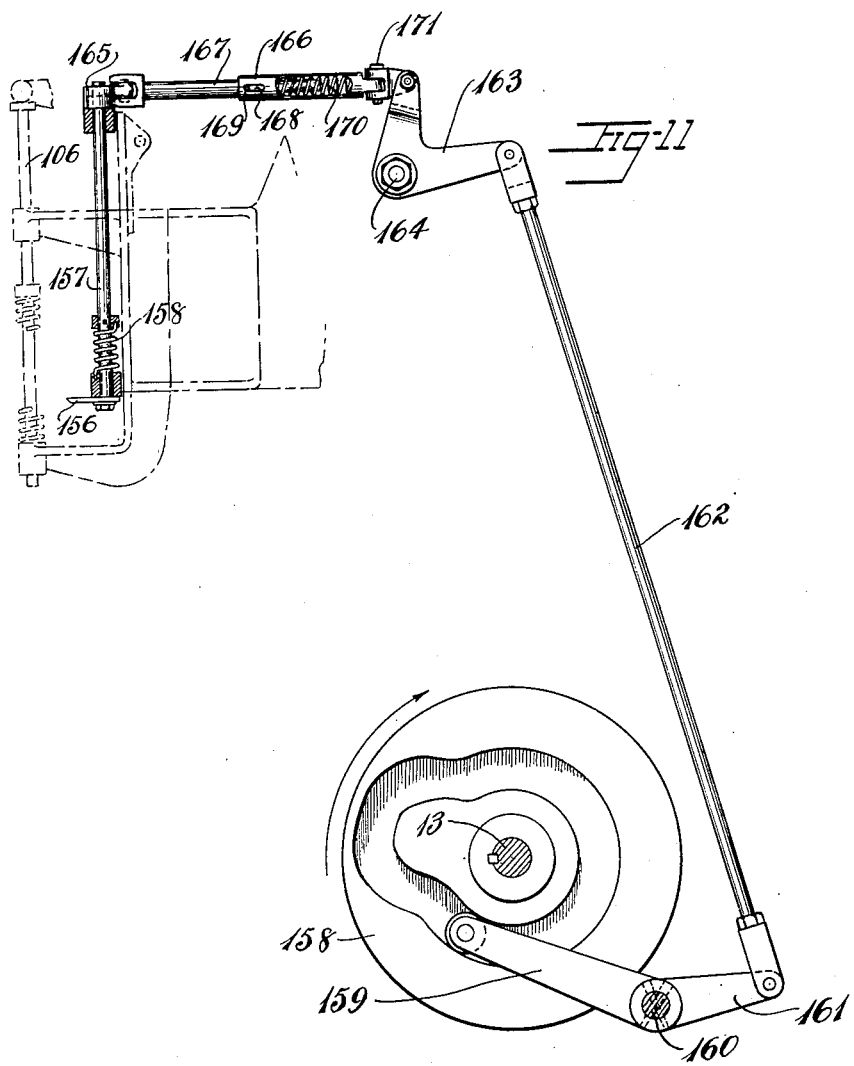

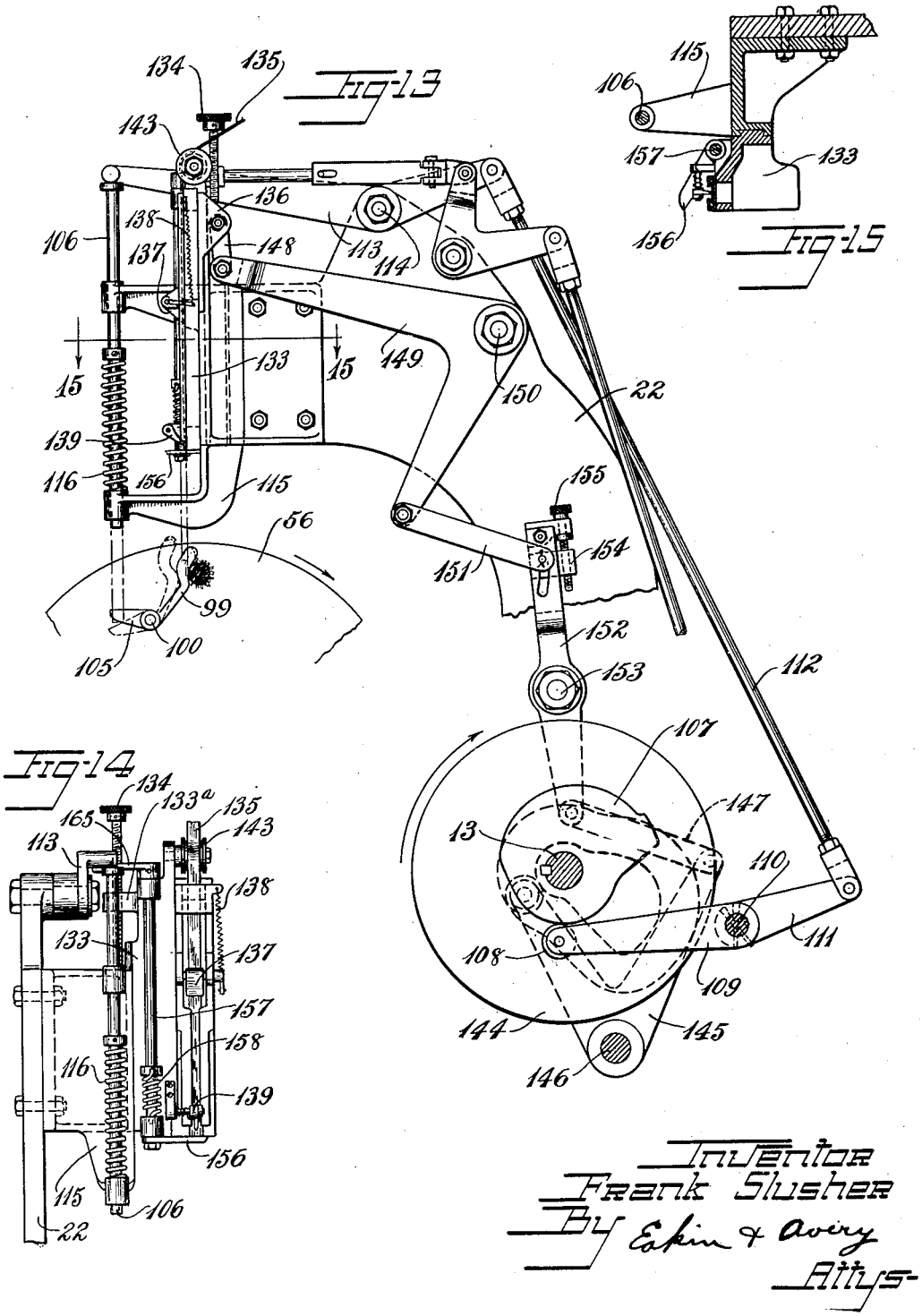

Aug. 7, 1934.   F. SLUSHER   1,969,160
BANDING MACHINE
Filed March 6, 1933   7 Sheets-Sheet 7
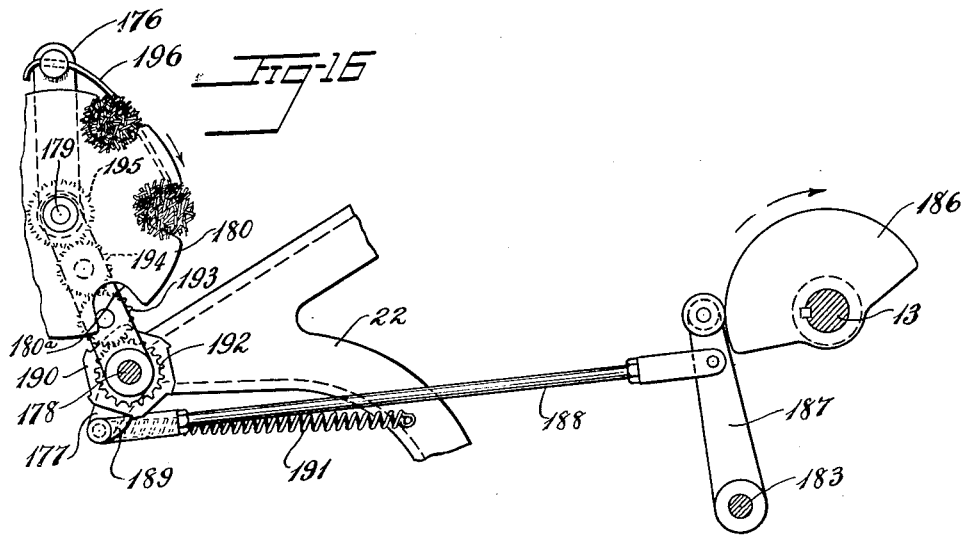
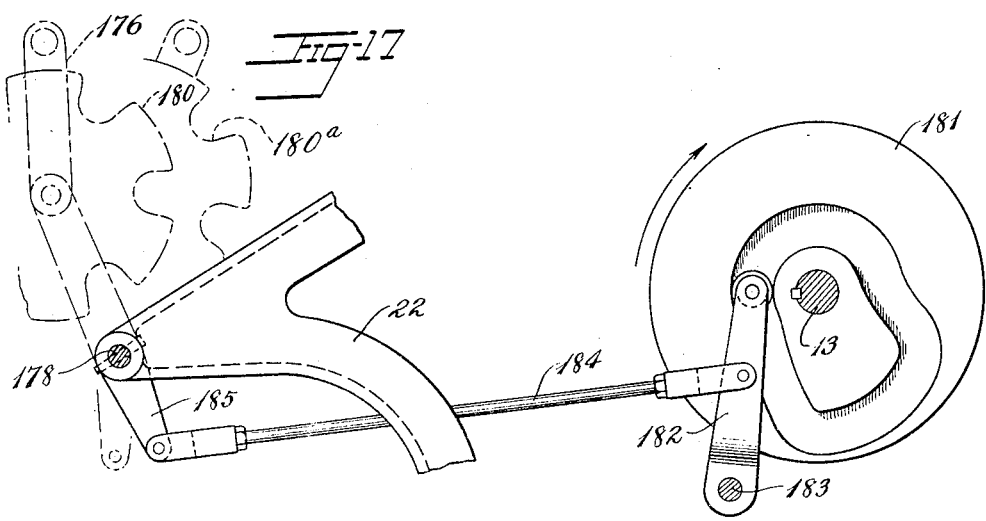
Inventor
Frank Slusher
By Eakin & Avery
Attys- Patented Aug. 7, 1934

1,969,160

UNITED STATES PATENT OFFICE 1,969,160

BANDING MACHINE

Frank Slusher, Akron, Ohio, assignor to The B. F. Goodrich Company, New York, N. Y., a corporation of New York Application March 6, 1933, Serial No. 659,695

18 Claims. (Cl. 93—93)

This invention relates to machines for applying bands or labels around elongate articles loosely arrange in bundles or sheaves. The device is adapted for the application of paper labels to bundles of rubber bands, but also may be used for other purposes.

The principal objects of the device are to provide efficiency and economy of operation by mechanical manipulation of the bundles without hand labor.

Other objects will appear from the following description and the accompanying drawings:

In the drawings:

Fig. 1 is a side elevation of the machine, part of the frame being broken away.

Fig. 2 is a detail sectional view on line 2—2 of Figure 1 and showing the clutch-operating lever catch mechanism.

Fig. 5 is a sectional view on line 5—5 of Fig. 1, showing the bundle-manipulating mechanism, parts being broken away.

Fig. 6 is a sectional detail view on line 6—6 of Fig. 5.

Fig. 7 is a sectional detail view on line 7—7 of Fig. 5.

Fig. 8 is a sectional detail view on line 8—8 of Fig. 5.

Fig. 9 is a side elevation of the principal part of the machine on a larger scale, showing the side opposite to that shown in Fig. 1, the tape feeding mechanism and other parts of the machine being broken away.

Fig. 10 is a similar view showing only the bundle manipulating turret and cooperating stationary cam surfaces, the turret-ratcheting mechanism being removed for clearness.

Fig. 11 is a detail view of the tape-shear and its operating mechanism taken on line 11—11 of Fig. 3.

Fig. 12 is a plan view of the tape-shear, part of the operating mechanism being shown, and part broken away.

Fig. 13 is a view taken on line 13—13 of Fig. 3 showing the tape-feeding mechanism and the clamping mechanism for holding the leading end of the tape to the bundle, parts being broken away and only essential parts of the particular mechanisms being shown.

Fig. 14 is a front view of the tape feeding mechanism and tape shear, other parts being broken away.

Fig. 15 is a sectional detail view on line 15—15 of Fig. 13.

Fig. 16 is a detail view on line 16—16 of Fig. 3, showing the ratcheting mechanism for the bundle-feeding turret, parts being broken away.

Fig. 17 is a detail view on line 17—17 of Fig. 3, showing the mechanism for swinging the bundle-feeding turret, parts being broken away.

Fig. 18 is a detail sectional view on line 18—18 of Fig. 5.

Fig. 19 is a perspective view of the tape-holding arm.

Figure 3:
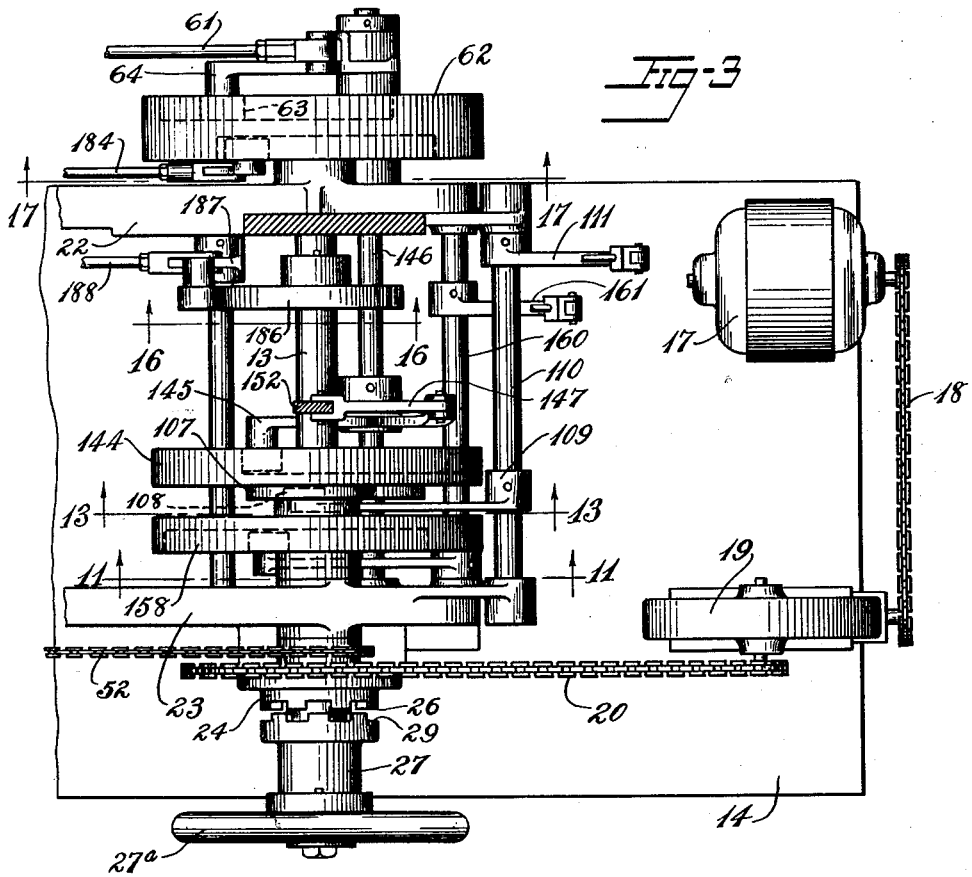
Fig. 3 is a sectional view of the rear portion of the machine, on line 3—3 of Fig. 1, the forward portion being broken away.
Figure 4:
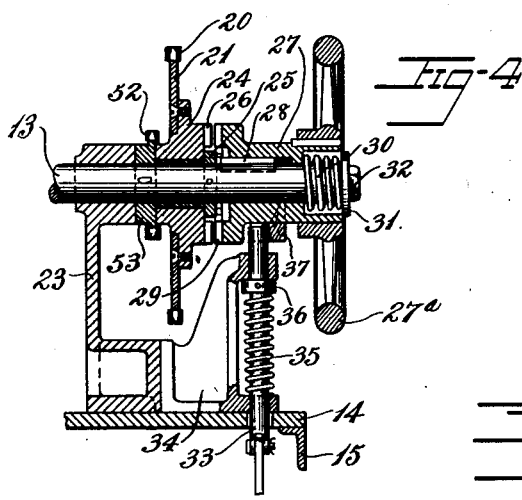
Fig. 4 is a detail sectional view on line 4—4 of Fig. 1, showing the clutch and associated mechanism.

Referring to the drawings, and particularly to Fig. 1, the machine generally comprises a bundle-manipulating turret 10 adapted to be intermittently rotated through quarter revolutions, and having means for supporting and rotating a plurality of bundles, a bundle-feeding turret 11 adapted to receive the bundles and deliver them in series to the bundle-manipulating turret, and a tape-feeding mechanism 12 for advancing tape from a roll, moistening the end thereof, feeding it in contact with the bundle and cutting it to length. The bundle-manipulating turret is adapted to compress the bundles and rotate them to apply the tape. Means are provided to discharge the banded bundles from the bundle-manipulating turret. The principal movements of these devices are controlled by a master cam-shaft 13, illustrated in Fig. 3 and other movements of the parts carried by the turrets are controlled by stationary cams and racks past which those parts are propelled.

Drive mechanism

Considering the machine more in detail, the supports for the moving parts are mounted upon a bed-plate 14 which conveniently is supported by a frame 15 (Fig. 1) which in turn is mounted upon castors 16 so that the machine may readily be moved to a convenient location for operation.

An electric motor 17 (Fig. 3) is mounted on the bed plate 14 and through a sprocket chain 18 drives a speed reducing unit 19 of the worm-and-gear type. The speed reducer supplies power to the master cam-shaft 13 through a sprocket chain 20 which engages a sprocket 21 rotatably mounted on the cam shaft 13.

To support the principal moving parts of the machine in proper relation to each other, a pair of frame members 22 and 23 are mounted on the bed plate 14 and are provided with aligned bearings in which the cam shaft 13 is rotatably journaled.

To provide for intermittent drive of the shaft 13, sprocket 21 is fixed to a collar 24 freely rotatable on shaft 13 retained by a collar 25 fixed to the shaft. Collar 24 has jaw clutch teeth 26 on its outer face. A collar 27 is slidably mounted on shaft 13, a feather key 28 being provided to prevent rotative movement thereof. Collar 27 is provided with jaw clutch teeth 29 adapted to interlock with teeth 26. A coil spring 30 encircling shaft 13 in an enlarged counterbore formed in collar 27 impinges against a stop washer 31 clamped to the end of the shaft by a cap screw 32, and normally urges collar 27 into engagement with collar 24 to lock sprocket 21 to the shaft 13. A latch bolt 33 is mounted to slide vertically in a bracket 34 fixed to bed plate 14 and normally is forced toward shaft 13, below which it is located, by a coil spring 35, the lower end of which engages the bracket 34 and the upper end of which engages a collar 36 pinned to the latch-bolt.

A cam-lug 37, projecting from collar 27 and having a helical leading face, is so located as to engage the upper end of the latch bolt 33 when in its normal raised position and thereby to force the collar 27 away from collar 24, disengaging the clutch teeth 26 and 29. Depression of the bolt 33 permits spring 30 to reengage the clutch members.

For depressing the latch-bolt 33 and permitting the clutch to engage, a lever 38 is pivoted to the frame at 39 and is connected to the latch bolt by a link 40.

To provide for operation of the clutch without material effort on the part of the operator, an armature 41 is attached to lever 38 by a link 42 and enters a solenoid 43. A normally opened switch 44 is mounted on the machine where it may be closed by contact of the operator. A normally closed switch 45 is mounted on frame 15 where it will be closed by contact with lever 38 when the latter is depressed. These two switches are wired in series with the solenoid 43 and a source of electrical energy, the source of energy and the wiring not being shown in the drawings. When switch 44 is momentarily closed the circuit is completed and the energized solenoid 43 depresses lever 38 and bolt 33, whereupon switch 45 opens the circuit and allows the latch bolt 33 to return and withdraw the clutch.

In order to prevent the latch bolt returning before the shaft 13 has rotated nearly a complete revolution, and as the rotation of the shaft 13 is relatively slow, mechanical means are provided for retaining the latch bolt in lowered position during a certain time interval. For this purpose a latch 46 is pivoted to the frame of the machine and is urged by a spring 47 toward the lever 38 (Fig. 2). A plunger 48 connected to the latch 46 projects through the bed plate 14. A shaft 49, journaled in frame member 23, has a sprocket 50 and a cam 51 fixed thereto. Sprocket 50 is driven by a chain 52 from a sprocket 53 fixed to shaft 13.

The arrangement is such that when lever 38 is depressed, latch 46 engages the lever and holds it down until the clutch has been engaged and shaft 13 has started its rotation, whereupon the cam 51 will be rotated and, before shaft 13 has completed one revolution, the cam will depress plunger 48 and release lever 38 to allow the catch bolt 33 to engage the cam lug 37 and disengage the clutch.

To provide for turning the shaft 13 by hand in observing the timing of the operations and in making adjustments, collar 27 is provided with a hand wheel 27ª.

*Bundle-manipulating turret*

The bundle-manipulating turret 10 comprises a shaft 54 (see Fig. 5) rotatably journaled in bearings provided by frame members 22, 23, in parallelism with shaft 13. A pair of discs 55, 56, are rigidly mounted on the shaft in spaced relation between frame members 22, 23. A ratchet wheel 57 is also fixed to shaft 54 (see Fig. 9).

In order to provide intermittent movement to the turret, a lever 58 is pivoted on shaft 54 and carries a pawl 59 which is held in engagement with the ratchet wheel by a spring 60. The other extremity of lever 58 is pivoted to a link 61. A cam 62 rigidly mounted on shaft 13 engages a roller 63 mounted on one arm of a bell-crank lever 64 which is fulcrumed on shaft 146 journaled in frame members 22 and 23. The other arm engages the link 61. The arrangement is such that at each revolution of shaft 13, turret 10 will be rotated through a quarter of a revolution.

For rotatively supporting bundles of articles, disc 55 is provided at equally spaced intervals with bearings in which spindles 65 are rotatably journaled. Disc 56 is similarly provided with bearings for spindles 66 in line with spindles 65, there being four sets of spindles on the turret for supporting four bundles. As each bundle manipulating carrier is similar only one will be described.

Spindle 66 has fixed thereto an arm 67 formed with a quill 68 parallel to spindle 66. Quill 68 has a narrow curved clamp finger 69 at its extremity. A cooperating clamp finger 70 is fixed to a shaft 71, journaled in the quill and having fixed thereto a pinion 72. An arm 73 is journaled on spindle 66 and its end normally projects beyond the disc 56 and there carries an anti-friction roller 74. Arm 73 is formed with gear teeth 73ª which engage the pinion 72. A tension coil spring 75, has one end fixed to arm 73 and the other fixed to arm 67. Arms 69 and 70 are curved so as to define a substantially circular space therebetween to engage a bundle of material to be wrapped when held toward each other by the spring 75, but when spindle 66 is prevented from turning as hereinafter described and arm 73 is rotated on spindle 66 against spring 75, finger 70 can be swung away to receive or discharge a bundle.

Similar bundle holding arms are provided for the opposite spindle 65 as follows: An arm 77, formed with a quill 78 and having a bundle holding arm 79, is fixed to spindle 65. A bundle-holding arm 80 is fixed to a shaft rotatable in the quill and having a pinion 81 fixed thereto to engage a toothed arm rotatable on spindle 65 and carrying an anti-friction roller 82. The operation of these parts is similar to that of the parts on the opposite spindle.

To provide for movement of the bundle-holding fingers or arms on opposite spindles in unison, a shaft 83 extends through bearings in discs 55 and 56 and has a pinion 84 fixed to one end and a pinion 85 fixed to the other. Pinion 84 engages an idler gear 86 rotatable on a stud fixed to disc 56. Gear 86 also engages a pinion 87 fixed to spindle 66. A pinion 88 is also fixed to spindle 66 in position to engage a stationary rack 89 fixed to frame member 22, the arrangement being such that when spindle 66 passes the rack it will be rotated thereby.

Pinion 85 engages an idler gear 86′ rotatable on a stud fixed to disc 55. Gear 86′ engages a pinion 90 fixed to spindle 65. As spindles 65 and 66 are geared together, the rotation of one with relation to the turret rotates both.

For locking spindles 65 and 66 with relation to the turret, spindle 65 is equipped with a disc 91 fixed thereto and having a single peripheral notch 91a. A detent lever 92 is pivoted at 93 to disc 55. It carries an anti-friction roller 94 adapted to engage a stationary cam 95 during the rotation of the turret to lift the detent from locking engagement with disc 91 during a certain part of the travel of the turret. Springs 96 connect the several detent levers 92 in such manner as normally to hold them in locked position.

When the spindles 65 and 66 are locked against rotation by the detent 92, fingers 70 and 80 may be rotated on their shafts to release the bundles by rotation of lever carrying rollers 74 and 82. For accomplishing this opening of the bundle gripping fingers stationary cam surfaces 97 and 98 are provided along the path of rotation of the turret to depress rollers 74 and 82.

To provide means for smoothing and guiding the tape and compacting the bundle to be wrapped a tape guiding and smoothing arm 99, (see Figs. 5, 6, and 7) is centrally mounted on a shaft 100 which is journaled in discs 55 and 56. This arm has a broad face curved to conform to the surface of the bundle. An arm 101 fastened to the same shaft is engaged by one end of a tension coil spring 102, the other end of which is anchored to disc 56. This spring normally holds the curved face of the arm 99 against the bundle.

To retract the arm 99 throughout the arc of rotation of the turret within which the bundle is discharged from the turret, an arm 103, fixed to shaft 100 projects beyond the periphery of disc 55 and is adapted to be deflected by a stationary cam surface 104 on cam 97.

To retract the arm 99 to permit the end of the tape to be advanced to engage the bundle when the turret is not rotating, an arm 105, attached to shaft 100, is adapted to be rotated by a plunger 106, (see Fig. 13).

The plunger 106 is actuated by a cam 107 located on shaft 13. A roller 108 on an arm 109 fixed to a shaft 110, rotating in frame members 22 and 23, engages the cam. An arm 111, fixed to shaft 110, is pivotally connected to a connecting rod 112 which engages one arm of a bell-crank lever 113, pivoted at 114. The other end of the lever 113 rests upon the upper end of plunger 106. Plunger 106 is guided in a bracket 115 and is normally held in its upper position by a coil spring 116.

In order further to assist in smoothing the band of tape to compact the bundle, and to press the gummed end of the tape securely in place, another arm 117 is rotatably mounted on shaft 100. A shaft 118, journaled in disc 56 has a lever 119 rotatably mounted thereon but confined to rotative movement within a small angle by a pin and slot connection as at 119a, (see Fig. 18). A link 120 connects arm 117 and arm 119. A tension coil spring 121 has one end anchored to shaft 54 and the other end is attached to arm 117 normally to hold it away from the bundle. An arm 122 is rigidly mounted on shaft 118 at the outside of the turret and carries an anti-friction roller 123 in position to engage a stationary cam surface 124, (see Figs. 9 and 10) supported by the frame member 22, to force arm 117 against the bundle during a certain arc of rotation of the turret.

In order to provide for combined pressing of both arms 99 and 117 against the bundle to shape the bundle and clamp the glued end of the tape, even when the bundles vary in size, an arm 125 is rigidly mounted on shaft 118. Arm 125 is provided with a locking face 125a adapted to engage over arm 101 when arm 117 is advanced. A tension coil spring 127 is connected between the ends of arms 125 and 119, normally holding these parts in close relation. This permits arm 117 to advance far enough to clamp the smallest bundle, the spring 102 and lost motion connection 119a permitting arm 117 to be resiliently held against the bundle and to yield when larger bundles are present.

In the use of the device the leading end of the gummed label tape is advanced between arm 99 and the bundle to provide means for clamping the end so advanced to the bundle, quill 78 is provided with a lug 78a in which a shaft 128 is journaled. An arm 129 is fastened to one end of the shaft and an arm 130 to the other end. Arm 129 is laterally turned at its outer end so as to overlie the end of the tape and clamp it against the bundle. A spring 131 is provided to urge the arm toward the bundle. An arm 132 (see Figs. 5 and 7) is rigidly mounted on shaft 100 in position to engage arm 130 when shaft 100 is rotated by plunger 106 and to withdraw arm 129 from the bundle to allow the tape to be advanced.

*Tape-feeding mechanism*

To supply tape to the bundle-manipulating turret, frame member 22 extends above the turret and supports the bracket 115. Bracket 115 is formed with a dove-tailed guideway in which a tape-guide 133 is vertically movable. The tape guide is provided with a threaded lug 133a, through which an adjusting screw 134 is threaded. It is also formed with a T-slot open at the front through which the tape 135 is guided. A cross-head 136 is slidably mounted on the guide 133 and provided with a friction feed finger 137 (see Fig. 14) held against the tape through the opening in the front of the guide by a coil spring 138. To hold the tape in its advanced position a friction pawl 139 is spring-pressed against the tape.

The tape, which preferably is of gummed paper, is supplied in a coil 140 and passes over an insulated metal pad 141 and under an insulated weighted roller 142, then over a guide roller 143 to the guide 133. To indicate when the coil 140 has been exhausted, roller 142 and pad 141 are included in an electric bell circuit (not shown) so that absence of paper between them rings the bell to notify the operator that the coil must be renewed.

To actuate the paper feeding cross-head, a cam 144 is provided on the shaft 13 and actuates a bell crank 145 mounted on a shaft 146, one arm of the bell crank being provided with a roller to engage the cam and the other arm connecting to a link 147. Cross-head 136 is connected by a link 148 to one arm of a bell crank lever 149 pivoted at 150 to frame member 22. The other arm of the bell crank 149 is connected to a link 151.

To provide for adjustment in the feed of the tape, a walking beam 152 is pivoted at 153 to frame member 22. One arm of the walking beam is connected to link 147, the other end carries a slide 154, adjustable along the beam by a screw 155. Slide 154 is pivoted to link 151, the arrangement being such that adjustment of screw 155 changes the length of the stroke of crosshead 136.

To sever the tape when advanced by the proper amount to supply one band, a shear blade 156 is mounted on a vertical shaft 157 journaled in bearings provided on slide 133. The shear blade is adapted to cooperate with the lower end of the slide to cut the tape and is normally held in open position by a torsion spring 158. As slide 133 is vertically adjustable, and the shear moves vertically with the slide, the length of the tape sections may be adjusted by raising or lowering the slide.

To actuate the shear blade, shaft 13 is provided with a cam 158. A follower arm 159 is fixed to a rock-shaft 160 journaled in frame members 22 and 23. An arm 161 fixed to the rock-shaft engages a connecting rod 162 which connects to one arm of a bell-crank 163, pivoted at 164 to the frame member 22. The other arm of bell crank 163 is connected to an arm 165 fixed to shaft 157, which carries the shear blade, by a lost-motion link comprising a barrel portion 166 and a plunger portion 167. The barrel is slotted as at 168 and the plunger is provided with a cross pin 169 which is retained within the slotted portion. A coil spring 170 is located in the barrel and holds the plunger 167 at extended position, the arrangement being such that should any material having greater resistance to shearing than the tape be passed under the shear blade, the spring 170 will prevent injury to the shear blade. In order to allow vertical adjustment of slide 133 without interfering with the knife actuating mechanism, the joint between plunger 167 and arm 165 is made a ball and socket connection. To provide universal movement between the barrel 166 and bell crank 163, a hinge joint 171 is provided therebetween to permit a lateral swinging movement of the barrel.

As the trailing end of the gummed label is cut from the tape by the shear, it is moistened by a sponge 172 projecting from a container 173 and supplied with water from a drip tank 174. A spring finger 175 rests against the tape just below the knife and opposite the sponge which the tape normally clears. When the tape is severed, the spring pressure is sufficient to press its trailing end into contact with the sponge.

Bundle feeding turret

In order to avoid danger to the operator's hands due to manually presenting the bundles to the gripping fingers of the bundle-manipulating turret, a supplemental feeding turret is provided as follows:

A swing-arm 176 is fixed to a rock-shaft 178 journaled in bearings provided by the framemembers 22 and 23. It is provided with a stud 179 on which are journaled a pair of discs 180 formed with similar peripheral notches 180a for receiving the bundles. The discs 180 are connected and of such thickness and so spaced as to pass between the fingers 69 and 79, and straddle the arms 99.

Arm 176 may be swung from the position shown in Fig. 1, which is the loading position, to a position where the bundle in one of the notches is aligned with spindles 65, 66 of the bundle-manipulating turret. For this purpose, shaft 13 is provided with a cam 181 (see Fig. 17) which engages a roller of a follower arm 182 pivoted on a rock-shaft 183. A connecting rod 184 is pivoted at one end to arm 182 and at the other end to an arm 185 fast on shaft 178.

In order to propel discs 180 to advance a series of bundles in succession to such position as to be engaged by the bundle gripping fingers, shaft 13 is provided with a cam 186, (see Fig. 16) fixed thereon. A follower arm 187 fixed to rock-shaft 183 has a roller engaging the cam and is connected to a connecting rod 188. A ratchet arm 177 is rotatably mounted on shaft 178 and its outer end is pivoted to connecting rod 188 and carries a pawl 189 which engages a ratchet wheel 190 also freely rotatable on shaft 178. A tension coil spring 191 has one end connected to arm 177 and the other to the frame of the machine and acts in a direction to hold the follower against the cam and advance the ratchet wheel. The ratchet wheel is formed integral with a gear wheel 192 which, through a train of gears 193 and 194 journaled on studs formed on arm 176, drives a gear 195 fixed to discs 180.

A spring guide finger 196 mounted on arm 176 insures seating of the bundles in the notches of discs 180.

A brake band 197 (see Fig. 9) engages a brake drum 198 fixed to disc 56 and prevents overrunning of the bundle manipulating turret.

In order to eject the bundles from the bundle-manipulating turret after the labels have been applied thereto, a shaft 199 is journaled in frame members 22, 23, and extends therebetween. A gear wheel 200 fixed to shaft 199 engages a gear 201 fixed to shaft 49 previously described. A pair of knock out arms 202, 202a is also fixed to shaft 199 in such position as to pass between fingers 69 and 79 and push the bundles therefrom.

Operation

The operation of the machine is as follows: The operator places bundles of rubber bands or other articles in series in the notches of the discs 180. As each bundle is placed in a notch, the operator depresses the switch 44, this engages the clutch on the master cam shaft 13 and thereupon the cam shaft rotates through one revolution and comes to rest. During this single rotation of the cam shaft, one complete cycle of operation is performed by the machine, but since the bundle manipulating turret is rotated through only a 90 degree angle and is equipped with four sets of bundle-rotating spindles, four cycles of movement of the machine are necessary to complete the operations upon each bundle, and four bundles are operated upon at a time.

Assuming that only one bundle is being fed through the machine and that at the start the bundle is located at position A in Fig. 1, the various cams located on the cam shaft 13 will be in the positions shown in the drawings with respect to each other and to their followers. It will be noted that all the cams are at a position of dwell with the exception of cam 62, which ratchets the bundle-manipulating turret.

During the first 120 degrees rotation of shaft 13, the turret spindle at C in Fig. 1 will be moved to a position adjacent bundle B by the action of cam 62 and will come to rest and cam 186 will have rotated to such a position as to permit spring 191 to rotate the discs 180 so that the bundle at A will have been moved to position B. Just before the turret comes to rest the rollers 74, 82 will be in engagement with cam rails 97 and 150

98 and arm 73 will be engaged by cam rail 104 thereby holding the bundle gripping fingers 69, 70 and 79, 80 in open position and arms 117 out of the way for deposit of a bundle. Roller 123 will be out of contact with its cam surface 124, gear 88 will be free of its rack and disc 91 will be locked.

After cam shaft 13 has moved about 45 degrees, cam 181 will start to advance discs 180 with the bundle to a position where the bundle is aligned with the gripping fingers. This movement will be completed at about 90 degrees rotation of the cam, which then withdraws discs 180, completing the return at about 180 degrees of rotation.

As the turret 10 completes its forward movement, rollers 74, 82 pass the end of cam surfaces 97, 98 and the gripping fingers grasp the bundle.

During most of the remainder of the first revolution of cam shaft 13 the turret is at rest, as its ratchet is moving backwards and this is also true of the discs 180.

When the clutch is engaged the second time, the rotation of the turret 10 carries the bundle just considered to a point below the tape feeding device during its forward movement. The spindles are still locked to the turret during this cycle. During the last half of the cycle, the turret being stationary, plunger 106 is forced down and retracts arm 99 as shown in Fig. 13 and the tape is advanced to contact with the bundle. The plunger 106 is then retracted. When arm 99 is raised from the bundle it carries with it finger 129, and upon its return the finger advances and clamps the end of the tape while the shear 156 severs the tape to length and causes the wetting of the gum on its trailing end. Near the end of the cycle, as the turret is again slightly advanced before the clutch is thrown out, the bundle is carried from the tape feeding position, carrying the cut length of tape with it. Cam roller 123 is deflected by stationary cam 124 so as to bring arms 99 and 117 into clamped engagement to slightly press the bundle to form.

During the third cycle of cam shaft 13, the turret again starts rotating and roller 94 engages stationary cam 95, lifting lock-arm 92 and releasing the spindles. At this point gear 88 engages the rack 89 and rolling therealong spins the spindles through two revolutions to wind the tape about the bundle. The arms 99 and 117 hold the bundle in shape and guide the tape thereabout, and insure sticking of the end of the tape.

During the remaining cycle of the cam shaft, roller 94 drops off the cam 95 and gear 88 leaves the rack 89, thereby locking the spindles. Rollers 74, 82, engage the cam surfaces 97, 98, and open the gripping fingers and finger 129. Arm 103 engages cam surface 104 lifting arm 99, and fingers 202 and 202ª contact with the bundle and discharge it from the gripping fingers, where it has been held only by the finger 129.

It will be understood that while the operations on one bundle have been described, the operations described as occurring during four revolutions of cam shaft 13 are performed on four bundles during each cycle so that one bundle is wrapped during each revolution of the cam shaft.

I claim:

1. Apparatus for applying a band to a bundle of elongate articles, said apparatus comprising a movable carrier, means carried thereby for holding a bundle of limp articles in compacted relation, means for feeding a band into contact with the bundle while the articles are so held, and means for rotating the holding means to wind the band around the bundle.

2. Apparatus for applying a band to a bundle of elongate articles, said apparatus comprising a rotatable turret, means carried thereby for holding a bundle of limp articles in compacted relation, means for feeding a band into contact with the bundle while the articles are so held, and means for rotating the holding means to wind the band around the bundle.

3. Apparatus for applying a band to a bundle of elongate articles, said apparatus comprising a movable carrier, means carried thereby for holding a bundle of limp articles in compacted relation, means for feeding a band to the bundle while the articles are so held, means for holding the band against the bundle, and means for rotating the bundle to wind the band thereabout.

4. Apparatus for applying a band to a bundle of elongate articles, said apparatus comprising a movable carrier, means carried thereby for holding the ends of a bundle of limp articles, means for feeding a band to the bundle, means for clamping the end of the band to the bundle while compacting the articles intermediate the ends thereof, and means for rotating the bundle to wind the band thereabout.

5. Apparatus for applying a band to a bundle of elongate articles, said apparatus comprising a movable carrier, means carried thereby for holding the ends of a bundle of limp articles, means for feeding a band to the bundle, means for clamping the end of the band to the bundle intermediate the ends of the bundle, means for compacting the bundle where the band is to be applied, and means for rotating the bundle to wind the band thereabout.

6. Apparatus for applying a band to a bundle of elongate articles, said apparatus comprising a movable carrier, means carried thereby for holding a bundle, means for feeding an extensive strip of band material into engagement with a bundle, means for cutting a band from said strip, and means for rotating the bundle to wind the strip thereabout.

7. Apparatus for applying a band to a bundle of elongate articles, said apparatus comprising a movable carrier, means carried thereby for holding a bundle, means for feeding an extensive strip of band material into engagement with the bundle, means for clamping the leading end of the strip to the bundle, means for cutting a band from said strip, and means for rotating the bundle to wind the strip thereabout.

8. Apparatus for applying a band to a bundle of elongate articles, said apparatus comprising a movable carrier, means carried thereby for holding a bundle, means for feeding an extensive strip of band material into engagement with the bundle, means for clamping the leading end of the strip to the bundle, means for cutting a band from said strip, means for moistening the band, and means for winding the band around the bundle.

9. Apparatus for applying a band to a bundle of elongate articles, said apparatus comprising a movable carrier, means carried thereby for holding a bundle, means for feeding an extensive strip of band material into engagement with the bundle, means for cutting a band from said strip, means for rotating the bundle to wind the band thereabout, and means for adjusting the relation of the band cutting means to the bundle rotating means to cut bands of different lengths.

10. Apparatus for applying a band to a bundle of limp elongate articles, said apparatus comprising a movable carrier, means carried thereby for holding a bundle of limp articles, means for locking said holding means to the carrier throughout a part of the movement of the carrier, means for supplying the leading end of a band to said bundle while the holding means is so locked to the carrier, and means for twirling the holding means with respect to the carrier during another part of its movement.

11. Apparatus for applying a band to a bundle of limp elongate articles, said apparatus comprising a rotatable turret, a bundle holding spindle carried thereby, means for rotating the turret means for supplying the leading end of a band to a bundle held by said spindle, means for rotating said spindle with relation to the turret during a portion of the movement of the turret to wrap the band around said bundle, and means for locking the spindle to the turret during another part of the travel thereof to permit discharge of the bundle from said spindle.

12. Apparatus for applying a band to a bundle of elongate articles, said apparatus comprising a rotatable turret, a bundle holding spindle rotatably carried thereby, means for imparting a step-by-step rotative movement to the turret, means controlled by the movement of said turret for twirling said spindle with relation to the turret, and means located adjacent to the turret for feeding a strip of band material to a bundle held by said spindle between successive movements of the turret.

13. Apparatus for applying a band to a bundle of elongate articles, said apparatus comprising a rotatable turret, a bundle holding spindle carried thereby, means for imparting a step-by-step rotative movement to the turret, means located adjacent to the turret for feeding a strip of band material to a bundle held by said spindle between successive movements of the turret, and means for providing a planetary rotation of the spindle during movement of the turret to wind the band thereabout.

14. Apparatus for applying a band to a bundle of elongate articles, said apparatus comprising a rotatable turret, a bundle-holding spindle carried thereby, means for imparting a step-by-step rotative movement to the turret, means for feeding a band into engagement with a bundle held by said spindle between successive movements of the turret, means carried by said spindle for clamping the end of the strip to the bundle, and means for imparting a planetary movement to the spindle during the rotation thereof to wind the band to the spindle.

15. Apparatus for applying a band to a bundle of elongated articles, said apparatus comprising a rotatable turret, a bundle holding spindle carried thereby, means for imparting a step-by-step rotative movement to the turret, means for feeding a band into engagement with a bundle held by said spindle between successive movements of the turret, means carried by said spindle for clamping the end of the band to the bundle, means carried by the turret to partially enclose the bundle and form a guide for the band, and means for retracting said clamping and enclosing means during the advance of the band.

16. Apparatus for applying a band to a bundle of elongate articles, said apparatus comprising a rotatable turret, means for intermittently advancing the turret in a series of rotative movements each comprising a part of a revolution, a pair of aligned spindles carried by the turret and adapted to be operated in unison, means carried by said spindles for holding a bundle, means for closing the holding means over a bundle during one movement of the turret, means for feeding a band into engagement with the bundle after the first movement of the turret, means for rotating the spindles during a succeeding movement of the turret to wrap the band around the bundle, means controlling the holding means during another movement of the turret for locking the spindle to the turret and releasing the holding means, and means for stripping the bundle from said holding means.

17. Apparatus for applying a band to a bundle of elongate articles, said apparatus comprising a bundle manipulating turret, means carried thereby to hold a bundle, means for intermittently advancing the turret, means for applying a band to said bundle during the advance of the turret, a bundle feeding turret, means for moving the feeding turret toward and from the bundle-manipulating turret, and means for intermittently rotating the feeding turret as it is so advanced to align a bundle with the holding means.

18. Apparatus for applying a band to a bundle of elongate articles, said apparatus comprising a bundle-manipulating turret, bundle clamping means carried thereby, means for rotating the turret through a step-by-step movement, means located in the path of the turret for feeding a band to a bundle carried thereby, means located in the path of the turret for opening the clamping means during travel thereof to receive and discharge bundles, and additional means operable during a dwell of the turret to open the clamping means to admit the end of the band.

FRANK SLUSHER.